United States Patent [19]

Kürschner et al.

[11] Patent Number: 5,795,841
[45] Date of Patent: Aug. 18, 1998

[54] PROCESS FOR PRODUCING COATED, NONPOROUS SUPPORT MATERIALS

[75] Inventors: Stefan Kürschner, Bergisch Gladbach; Jörg-Dietrich Jentsch, Mülheim; Heinz-Gerd Darius, Solingen, all of Germany

[73] Assignee: Bayer Aktiengesellschaft, Leverkusen, Germany

[21] Appl. No.: 682,177

[22] Filed: Jul. 17, 1996

[30] Foreign Application Priority Data

Jul. 24, 1995 [DE] Germany .............. 19526926.8

[51] Int. Cl.$^6$ .............. B01J 23/00; B01J 23/42; B05D 3/02
[52] U.S. Cl. .............. 502/325; 502/339; 502/344; 427/226; 427/229
[58] Field of Search .............. 502/300, 325, 502/326, 339, 344; 427/229, 226

[56] References Cited

U.S. PATENT DOCUMENTS

| | | | |
|---|---|---|---|
| 3,799,886 | 3/1974 | Felice et al. | 502/350 |
| 4,129,434 | 12/1978 | Plumat et al. | 427/229 |
| 4,170,460 | 10/1979 | Donley | 427/229 |
| 4,522,847 | 6/1985 | Cornet et al. | 427/229 |
| 5,525,570 | 6/1996 | Chakraborty et al. | 502/339 |

FOREIGN PATENT DOCUMENTS

| | | |
|---|---|---|
| 1592666 | 5/1970 | France . |
| 2125390 | 9/1972 | France . |
| 899648 | 12/1953 | Germany . |
| 2025430 | 12/1971 | Germany . |
| 1237954 | 7/1971 | United Kingdom . |
| 1346943 | 2/1974 | United Kingdom . |

*Primary Examiner*—Glenn Caldarola
*Assistant Examiner*—In Suk Bullock
*Attorney, Agent, or Firm*—Sprung Kramer Schaefer & Briscoe

[57] ABSTRACT

Nonporous inorganic support materials can be coated with metal and/or metal oxide in an abrasion-resistant manner by applying very dilute aqueous solutions of at least one metal compound to the heated shaped body so that the water can vaporize immediately and, if desired, subsequently calcining the shaped bodies at elevated temperature.

4 Claims, No Drawings

PROCESS FOR PRODUCING COATED, NONPOROUS SUPPORT MATERIALS

The invention relates to a process for producing inorganic supports having a low specific surface area which are coated in an abrasion-resistant manner with metal and/or metal oxide, according to which the inorganic supports are treated at elevated temperature with the aqueous solution of a metal compound.

Metals, preferably noble metals, bound to supports are used in elemental form or as oxides for catalysing many industrial processes. In many cases, porous materials are used as catalyst supports because the pores are well suited for taking up the catalytically active substances. The procedure is very often to impregnate the porous supports with an aqueous metal salt solution and subsequently to deposit the metal on the support by reduction of the salt. The resulting shaped bodies of metal-coated porous supports are generally abrasion-resistant and have good utility in industry.

Since catalysts are very often used in aggressive media having extreme pH values and/or at very high temperatures, it is desirable to keep the surface area and thus the attack area as small as possible. Owing to their high surface areas, porous supports do not meet this requirement. However, in the case of nonporous support materials, the application method which is so successful in the case of porous supports leads to shaped bodies having high abrasion—obviously because the pores or at least a rough surface of the support material are a prerequisite for good adhesion.

It was thus an object of the invention to provide a very simple process for producing a support coated with metal and/or metal oxide and having a very low specific surface area, which leads to very low-abrasion shaped bodies without the use of organic and inorganic binders. Low abrasion usually leads to a higher operating life and also to reduced expense in the work-up. This would make the use much easier.

Completely surprisingly, it has now been found that this object can be achieved very elegantly and without producing wastewater by treating the support at elevated temperature with the aqueous solution of a metal compound.

The invention accordingly provides a process for producing supports coated with metal and/or metal oxide and having a low specific surface area, without the use of organic and inorganic binders, characterized in that the aqueous solution of at least one metal compound is applied to inorganic support material having a BET surface area of less than 3 m$^2$/g, preferably material having a smooth structure, at a temperature which allows the immediate vaporization of the water.

Preferred inorganic supports are ceramic supports, in particular those based on aluminium oxide and/or silicate, for example aluminium oxide, the various aluminium silicates, silicon carbide containing aluminium oxide and silicon dioxide, zirconium dioxide with and without proportions of aluminium oxide and silicon dioxide, titanium dioxide with and without proportions of aluminium oxide and silicon dioxide, i.e. for example corundum, feldspar, mica, steatites, ceramic stoneware, glass, quartz. The supports can be used as pellets, as granules, as extrudate, as hollow extrudate, as tube sections, as rings or in the shape of lenses; advantageously are support materials capable of rolling; particular preference is given to spheres. The supports preferably have a particle diameter of from 0.5 to 100 mm, in particular from 1 to 20 mm.

The BET surface area is determined in accordance with DIN 66132.

Preferred metal compounds comprise water-soluble compounds of the elements Ba, V, Si, Cr, Mn, Fe, Co, Ni, Cu, W, Re, Sn, Pb, particularly the noble metals such as Ru, Rh, Pd, Ag, Os, Ir, Pt, Au.

Suitable compounds are, for example, the oxides, hydroxides, carbonates, nitrates, salts of organic acids such as oxalates and the ammine complexes. They can have, for example, the formulae

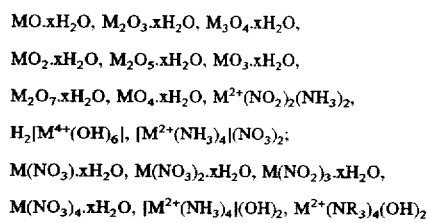

where M=metal and R=$C_1$–$C_4$-alkyl such as methyl, ethyl, etc.

Compounds are "water-soluble" for the purposes of the invention if they can be dissolved in a concentration, calculated as metal, of 0.01% by weight, preferably 0.05% by weight, in water at 30° C.

For the purposes of the present invention, temperatures which allow the immediate vaporization of the water mean temperatures of from 50° to 400° C., preferably from 100° to 300° C. To accelerate the vaporization of the water, it is also possible to work under reduced pressure. This is particularly advisable if it is intended to work at temperatures below 100° C. The pressure is matched to the desired temperature. In principle, the pressures can be varied within wide limits below 1 bar, but for practical reasons the pressures used are generally not below 20 mbar. If glass or other supports sensitive to thermal shock are employed, the process is generally carried out at temperatures which are as low as possible, so that under these circumstances working under reduced pressure is of particular interest.

On the other hand, in the case of supports sensitive to thermal shock, it is also possible to preheat the solution prior to application to the support.

It is important (e.g. for reasons of homogeneity) to keep the support material in continual motion during the process of the invention. Suitable apparatus are, for example, coating drums, rotary evaporators, etc.

The aqueous solution can contain the metal compound, calculated as metal, in a concentration of from 0.01 to 2% by weight, preferably from 0.05 to 1% by weight.

The procedure is advantageously to spray the aqueous solution onto the heated supports which are kept in motion and to supply heat so as to replace the heat of vaporization, so that the temperature of the supports is kept approximately constant.

If no particular measures are taken, supports coated with metal oxide are formed in the process. If the process is carried out in the presence of reducing agents, e.g. hydrogen, synthesis gas, ammonia, formates (for example ammonium formate), metal-coated supports can be obtained. This is also possible, for example, by using compounds which split off reducing constituents during the process (e.g. ammonia from ammine complexes).

The coated supports resulting from the process of the invention can, to improve the adhesion of the metal or metal oxide applied, be subsequently heated at temperatures of from 200° to 1000° C., preferably from 350° to 700° C., for a period of from 0.5 to 24 hours, preferably from 2 to 8 hours.

The coated supports are acid- and alkali-stable at room temperature if they are coated with noble metal or noble metal oxide.

The percentages in the following examples are in each case by weight.

EXAMPLES

EXAMPLE 1

20.775 kg of spheres of ceramic stoneware are heated to 200° C. in a suitable apparatus while being kept in continual motion. 3000 ml of an aqueous solution containing 29.4 g of $Pd(NH_3)_4(OH)_2$ are sprayed onto the support material over a period of 3 hours, with the temperature being held at 200° C. The coated support thus obtained is subjected to a subsequent thermal treatment at 550° C. for a period of 4 hours.

EXAMPLE 2

16.5 kg of spheres consisting of steatite are heated to 200° C. in a suitable apparatus while being kept in continual motion. 3000 ml of an aqueous solution containing 28.4 g of $Pd(NO_3)_2.2H_2O$ (palladium nitrate) are sprayed onto the support material over a period of 2 hours, with the temperature being held at 200° C.

The coated support thus obtained is subjected to a subsequent thermal treatment at 550° C. for a period of 4 hours.

EXAMPLE 3

16.5 kg of spheres consisting of steatite are heated to 200° C. in a suitable apparatus while being kept in continual motion. 10,000 ml of an aqueous solution containing 61.0 g of $Pd(NO_3)_2.2H_2O$ are sprayed onto the support material over a period of 2½ hours, with the temperature being held at 200° C.

After completion of the spraying procedure, the coated support is heated to 300° C. while still being kept in continual motion and subjected to a subsequent thermal treatment at 550° C. for a period of 4 hours.

EXAMPLE 4

9.9 kg of spheres consisting of steatite are heated to 200° C. in a suitable apparatus while being kept in continual motion. 6,000 ml of an aqueous solution containing 29.8 g of $[Pt(NH_3)_4](OH)_2$ are sprayed onto the support material over a period of 2½ hours, with the temperature being held at 200° C.

After completion of the spraying procedure, the coated support is heated to 300° C. while still being kept in continual motion and subjected to a subsequent thermal treatment at 550° C. for a period of 4 hours.

EXAMPLE 5

1490 g of spheres consisting of glass are heated to 110° C. in a suitable apparatus while being kept in continual motion. 400 ml of an aqueous solution containing 11.25 g of $[Pt(NH_3)_4](OH)_2$ are sprayed onto the support material over a period of 2 hours, with the temperature being held at 110° C.

After completion of the spraying procedure, the coated support is heated to 300° C. while still being kept in continual motion and subjected to a subsequent thermal treatment at 550° C. for a period of 4 hours.

EXAMPLE 6

1490 g of spheres consisting of glass are heated to 110° C. in a suitable apparatus while being kept in continual motion. 6000 ml of an aqueous solution containing 8.92 g of $Ni(NO_3)_2.6H_2O$ are sprayed onto the support material over a period of 2½ hours, with the temperature being held at 110° C.

After completion of the spraying procedure, the coated support is heated to 300° C. while still being kept in continual motion and subjected to a subsequent thermal treatment at 550° C. for a period of 4 hours.

EXAMPLE 7

1560 g of spheres consisting of ceramic stoneware are heated to 200° C. in a suitable apparatus while being kept in continual motion. 500 ml of an aqueous solution containing 29.8 g of $[Pt(NH_3)_4](OH)_2$, 3.939 g of $(NH_4)_2Cr_2O_7$, 0.1835 g of $Ba(NO_3)_2$, 0.6365 g of $Mn(NO_3)_2.4H_2O$, 0.7550 g of $Cu(NO_3)_2.3H_2O$, 3.1650 g of $Al(NO_3)_3.9H_2O$, 0.4188 g of $SiO_2$ and 0.5 ml of 65% strength $HNO_3$ are sprayed onto the support material over a period of 2 hours, with the temperature being held at 200° C.

After completion of the spraying procedure, the coated support is heated to 300° C. while still being kept in continual motion and subjected to a subsequent thermal treatment at 600° C. for a period of 4 hours.

EXAMPLE 8

9360 g of spheres consisting of ceramic stoneware are heated to 200° C. in a suitable apparatus while being kept in continual motion. 3000 ml of an aqueous solution containing 14.6 g of $Pd(NO_3)_2.2H_2O$, 10.71 g of $V_2O_5$ and 30.0 g of $(COOH)_2.2H_2O$ are sprayed onto the support material over a period of 2½ hours, with the support material being held at 200° C.

After completion of the spraying procedure, the coated support is heated to 300° C. while still being kept in continual motion and held at 300° C. for 20 minutes.

EXAMPLE 9

The procedure of Example 8 is repeated with the sole difference that the aqueous solution additionally contains 0.391 g of $Re_2O_7$.

We claim:

1. A process for producing supports coated with metal or metal oxide and having a low specific surface area, without using organic and inorganic binders, comprising applying an aqueous solution containing about 0.01% to about 2.0% by weight of a water-soluble noble metal compound calculated as metal to an inorganic rollable support material which is kept in motion having a BET surface area of less than 3 m²/g at a temperature which allows immediate vaporization.

2. Process according to claim 1, wherein the aqueous solutions are applied to support material at a temperature of from 100° to 400° C.

3. Process according to claim 1, wherein spherical support material is used.

4. Process according to claim 1, wherein the coated support material is heated at temperatures of from 200° to 1000° C.

* * * * *